US006505118B2

United States Patent
Chowanic et al.

(10) Patent No.: US 6,505,118 B2
(45) Date of Patent: Jan. 7, 2003

(54) NAVIGATION SYSTEM FOR LAND VEHICLES THAT LEARNS AND INCORPORATES PREFERRED NAVIGATION ROUTES

(75) Inventors: Andrea Bowes Chowanic, Farmington Hills, MI (US); Mark Edward Porter, Dearborn, MI (US); Thomas Joseph Hermann, Troy, MI (US)

(73) Assignee: Ford Motor Company, Dearborn, MI (US)

(*) Notice: Subject to any disclaimer, the term of this patent is extended or adjusted under 35 U.S.C. 154(b) by 0 days.

(21) Appl. No.: 09/769,898

(22) Filed: Jan. 26, 2001

(65) Prior Publication Data

US 2002/0111736 A1 Aug. 15, 2002

(51) Int. Cl.[7] .................. G01C 21/32; G01C 21/34
(52) U.S. Cl. .................. 701/209; 701/200-208; 701/210-215; 701/23; 701/24; 701/117; 701/25; 340/995; 340/906; 340/907; 340/988; 340/989; 340/990; 342/357.09; 342/357.13; 342/357.06; 455/466; 455/553; 455/556; 455/557
(58) Field of Search .................. 701/20, 215, 117, 701/23, 24, 25; 340/995, 906, 907, 988, 989, 990, 905, 910; 342/357.09, 357.13, 357.06, 357.07; 455/466, 553, 556, 557, 456

(56) References Cited

U.S. PATENT DOCUMENTS

| | | | | |
|---|---|---|---|---|
| 5,220,507 A | * | 6/1993 | Kirson | 340/995 |
| 5,237,323 A | * | 8/1993 | Saito et al. | 340/990 |
| 5,272,638 A | * | 12/1993 | Martin et al. | 340/990 |
| 5,291,413 A | * | 3/1994 | Tamai et al. | 340/990 |
| 5,369,588 A | | 11/1994 | Hayami et al. | |
| 5,371,678 A | | 12/1994 | Nomura | |
| 5,467,276 A | | 11/1995 | Tsuyuki | |
| 5,675,492 A | | 10/1997 | Tsuyuki | |
| 5,802,492 A | * | 9/1998 | DeLorme et al. | 340/990 |
| 5,845,227 A | * | 12/1998 | Peterson | 340/905 |
| 5,877,708 A | | 3/1999 | Hijikata | |
| 5,878,368 A | | 3/1999 | DeGraaf | |
| 5,905,451 A | | 5/1999 | Sakashita | |
| 5,919,246 A | | 7/1999 | Waizmann et al. | |
| 5,991,689 A | | 11/1999 | Aito et al. | |
| 6,298,303 B1 | * | 10/2001 | Khavakh et al. | 701/209 |

* cited by examiner

Primary Examiner—William A. Cuchlinski, Jr.
Assistant Examiner—Ronnie Mancho

(57) ABSTRACT

An adaptive navigation system for a land vehicle is provided that incorporates learned segments of preferred routes into adaptive calculated routes. The navigation system preferably includes a global positioning system or other sources of locator system data and a data processor that may be programmed with destination data and current location data. The data storage apparatus is capable of recording current location data as the vehicle travels to a destination. The system automatically develops a database of a plurality of segments of preferred routes where those segments are different from the route normally calculated by the data processor. On future occasions when the navigation system is used, the data processor is able to incorporate segments of preferred routes in an adaptive calculated route determination when the segments are within a predetermined degree of similarity to the calculated route.

4 Claims, 2 Drawing Sheets

NAVIGATION SYSTEM FOR LAND VEHICLES THAT LEARNS AND INCORPORATES PREFERRED NAVIGATION ROUTES

BACKGROUND OF THE INVENTION

1. Field of the Invention

The present invention relates to navigation systems for land vehicles.

2. Background Art

Navigation systems for land vehicles are available that provide maps and directions to vehicle drivers. Maps or directions may be generated that select the best route in terms of the estimated time required, shortest distance, and minimizing or maximizing the use of expressways or toll roads.

Global positioning systems (GPS) are available that provide accurate location data for a land vehicle. Data from a GPS can be provided as an input to an in-vehicle navigation system. In current navigation systems, location data may also be obtained from map matching positioning systems, dead reckoning systems using gyroscopic inputs and wheel speed sensors, and cellular telephone networks. Such data may be referred to generally as locator system data and is normally treated as a transient item of information that is used and then discarded by a navigation system when the vehicle moves to a new location.

People that use navigation systems may test the system against their own knowledge of a familiar route. If the system identifies a route that is perceived as inferior to a route that a driver would normally follow, the driver may develop a negative impression as to the effectiveness of the navigation system. A driver in this situation may believe that the navigation system is not as good as their own abilities to navigate and would be less likely to use a navigation system on familiar routes due to their negative impression of the effectiveness of the system.

In addition, it is believed that persons driving on familiar roads drive more proficiently than when driving on unfamiliar roads. Familiarity with hazards, such as potholes, traffic patterns, or blind spots, is beneficial to drivers and may foster safer, better informed driving.

There is a need for a navigation system that incorporates a driver's preferred route segments based upon locator system data that is obtained from a GPS or other source of locator system data as the vehicle travels. There is a need for a navigation system that can learn preferred route segments that are then utilized by the navigation system when providing maps and directions.

These and other disadvantages and problems associated with prior art navigation systems is addressed by Applicants' invention as summarized below.

SUMMARY OF THE INVENTION

According to the present invention, an adaptive navigation system for a land vehicle is provided that incorporates usage of segments of a driver's preferred routes.

The system includes a global positioning system (GPS) that provides a set of current location data corresponding to the current location of the vehicle. A data processor is provided with a set of destination data corresponding to a desired destination and is provided with the set of current location data prior to determining a calculated route to the destination. A data storage apparatus may store current location data as the vehicle travels to a destination. The data storage apparatus records current location data to develop a database of a plurality of segments of preferred routes. The segments of preferred routes are stored if they are different from the calculated route. The data processor incorporates segments of preferred routes in an adaptive, calculated route determination when the segments are within a predetermined degree of similarity to the calculated route. The data processor is able to provide either or both the calculated route and the adaptive calculated route that maximizes usage of segments of preferred routes.

According to another aspect of the invention, the data storage apparatus records current location data when the GPS is on and a calculated route has been selected and when the current location data deviates from the calculated route. Such deviations are stored as segments of preferred routes. In this way, the data storage apparatus need not store current location data when it matches the calculated route determined by the data processor. Once segments of preferred routes have been identified they may be incorporated in an adaptive calculated route.

According to another aspect of the adaptive navigation system of the present invention, the system would preferably unlearn or delete from memory deviations from the calculated routes that are terminated by stops that are not at the destination location. When a vehicle deviates from a calculated route and results in a stop, such as a stop for gas, food or to run an errand, it is presumed by the system that the deviation from the calculated route is not intended to be part of a future route that would justify its being identified as a segment of a preferred route.

These and other objects and advantages of the present invention will be better understood upon reference to the attached flowchart and diagram in light of the following detailed description of the preferred embodiment.

DETAILED DESCRIPTION OF THE PREFERRED EMBODIMENT(S)

Figure 1:
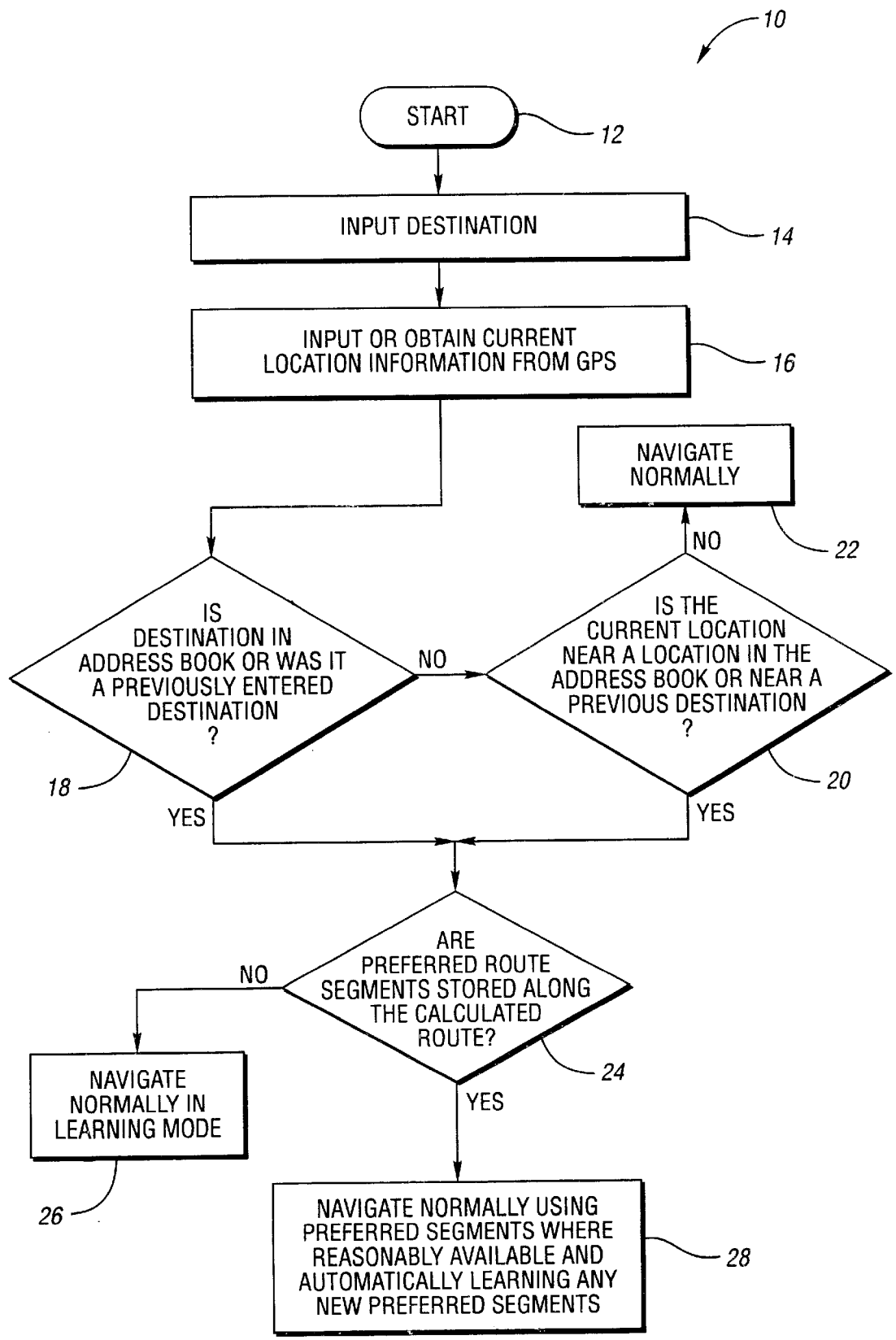
FIG. 1 is a flowchart showing the adaptive navigation system for a land vehicle of the present invention.

Referring now to FIG. 1, a flowchart illustrating one approach to providing adaptive navigation system for land vehicles is generally designated by reference numeral 10. The system initializes at 12. After the system is initialized, a user may input the destination at 14 and may either manually input or obtain current location information for the land vehicle from a global positioning system (GPS) at 16.

The system utilizing a computer or data processing device determines whether the selected destination is in the address book or if it was a previously entered destination at 18. If it is a new destination, the query is answered in the negative and the system determines whether the present location is in the address book or if it was a previous destination at 20. If the destination was in the address book, or was a previously entered destination, then the system checks at 24 to determine whether any preferred route segments are stored along the calculated route. If the present location is in the address book or was a previous destination, the system is directed at 20 to determine whether or not there are preferred route segments along the calculated route at 24. If the destination address is new and the present location is new in that it was not in the address book and was not a previous destination, then the system develops a calculated route and allows the user to navigate normally at 22.

If no preferred route segments are stored along the calculated route at 24, the system at 26 permits the user to navigate normally but does so in the learning mode wherein the system logs the deviation from the calculated route to identify preferred route segments along the calculated route. If there are preferred route segments stored along the calculated route, then the system at 28 directs the user to navigate normally using preferred segments where reasonably available while automatically learning any new preferred segments.

Figure 2:
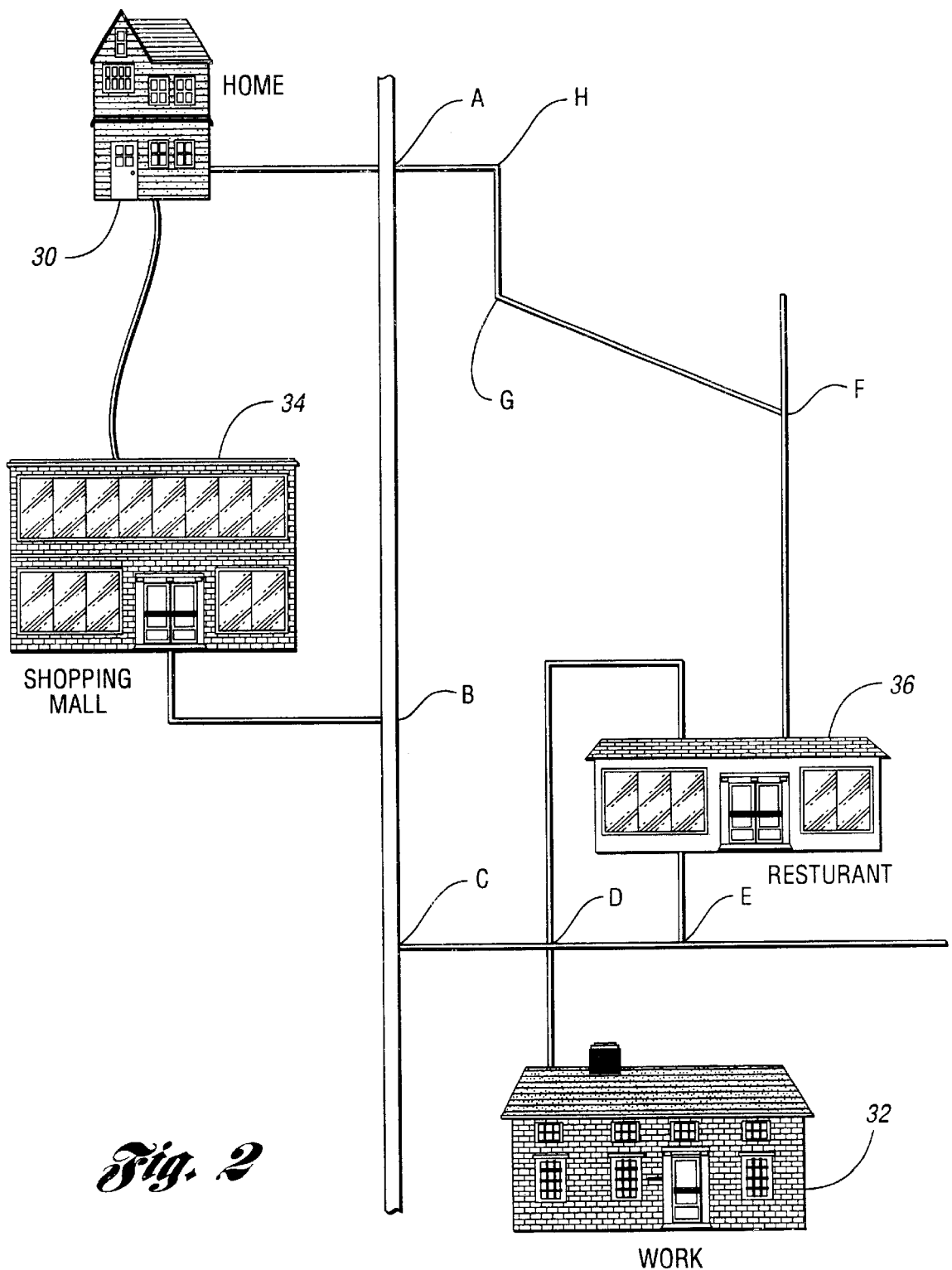
FIG. 2 is a drawing of a map showing different locations and potential routes between the locations.

Referring now to FIG. 2, a schematic map is provided to illustrate the concept of the present invention. On the map, four destinations are shown including the home 30 of the vehicle owner, the owner's work place 32, a shopping mall 34 and a restaurant 36. In the illustration one preferred route segment is defined by segment ABC which is a highway used by the owner of the vehicle to commute from home 30 to work 32.

Assuming that the owner is at home and wants to go to the shopping mall 34, the owner would input the shopping mall 34 destination and the computer could be set to calculate the shortest distance between home 30 and the shopping mall 34. The curved line segment between home 30 and shopping mall 34 is the shortest distance and would be selected as the calculated route. According to the present invention, the preferred route segment AB would be evaluated and, if appropriate, incorporated in a adaptive navigation route that would automatically be provided to the owner of the vehicle to provide a route that incorporates the driver's preferred segment AB, that is, home 30 to A, B and the mall 34.

The next scenario assumes the owner is at work 32 and wants to go to a restaurant 36. It is further assumed that the destination is a new destination not in the address book, and is not a previously entered destination. The system having made this initial determination would then determine that the present location is work 32, which is a known location to the system. The system would then check to determine if any appropriate preferred route segments were stored along the calculated route. Assuming it makes the determination that there are no preferred route segments stored along the route, the owner would navigate normally in the learning mode learning any new preferred route segments between work 32 and the restaurant 36.

Once the owner was at the restaurant 36 and wanted to return home, the system could provide a calculated route of F to A. Since the restaurant 36 would be now categorized as a previous destination, the system would determine if any preferred route segments were stored along the calculated route. The system could override the normal calculated route of A to F and instead recommend a route from the restaurant 36 to E, D, C, B, A and home 30. This route would incorporate the owner's normal route segment of A–D that are familiar roads to the driver. If the driver rejects the route incorporating the preferred segments and instead traverses from the restaurant 36 to F, G, H, A and home 30, the system would learn this segment as the preferred route between the restaurant and home for future reference.

In this way, a dynamic navigation system is provided that allows for adoption of new preferred segments and facilitates incorporating preferred segments in recommended navigation routes.

The system utilizes an algorithm to define limits within which preferred route segments would be replaced for calculated navigation routes. For example, if the navigation system is time of travel based, a calculated route having a time of travel of 20 minutes may incorporate preferred route segments if the preferred route segments would take no more than a predetermined additional increment, for example 10% more time, than the calculated route. If the incorporation of preferred route segments would add only one minute to a twenty-minute calculated routing, the preferred route segments would be incorporated. The same approach could be utilized for minimum distance criteria based systems wherein if following a preferred segment added only, for example, less than three miles to the length of the trip, the route would be plotted utilizing the preferred segment. If the preferred segment exceeded the three mile additional trip length criteria, the system would plot the calculated navigation route without using the preferred segment because it would add too much distance to the trip. Similar algorithms would be used for navigation systems that are prioritized to either avoid or maximize highway use, toll roads, and the like. Different decision criteria could be set by the owner of the vehicle or could be set as defaults in the navigation system as provided.

While the best mode for carrying out the invention has been described in detail, those familiar with the art to which this invention relates will recognize various alternative designs and embodiments for practicing the invention as defined by the following claims.

What is claimed:

1. An adaptive navigation system for a land vehicle comprising:

a locator system that provides a set of current location data corresponding to the current location of the vehicle;

a data processor that is provided with a set of destination data corresponding to a desired destination and is provided with the set of current location data, the data processor determining a calculated route to the destination;

a data storage apparatus wherein current location data is stored as the vehicle travels to a destination; and wherein the data processor automatically learns segments of preferred routes based the stored current location data and incorporates the segments of preferred routes in an adaptive calculated route determination when the segments are within a predetermined degree of similarity to the calculated route, whereby the data processor is enabled to provide the calculated route and the adaptive calculated route that incorporates usage of segments of preferred routes.

2. The adaptive navigation system for a land vehicle of claim 1 wherein the adaptive calculated route incorporates use of segments of preferred routes when the adaptive route containing the segments of preferred routes is within a predetermined time factor compared to the calculated route.

3. The adaptive navigation system for a land vehicle of claim 1 wherein the adaptive calculated route incorporates the use of a segment of a preferred route when the adaptive route containing the segments of preferred routes is within a predetermined range of the distance of the calculated route.

4. The adaptive navigation system for a land vehicle of claim 1 wherein segments of routes that are terminated by parking the vehicle at other than the destination location are not automatically learned.

* * * * *